(12) United States Patent
Zhang et al.

(10) Patent No.: US 9,966,812 B2
(45) Date of Patent: May 8, 2018

(54) STATIC VACUUM SHAFTING DEVICE FOR INTEGRATED ROTARY TRANSFORMER

(71) Applicant: SHANGHAI JIAO TONG UNIVERSITY, Shanghai (CN)

(72) Inventors: Bo Zhang, Shanghai (CN); Pinkuan Liu, Shanghai (CN); Xiaobo Zhu, Shanghai (CN); Yujie Li, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 425 days.

(21) Appl. No.: 14/775,574

(22) PCT Filed: Nov. 19, 2013

(86) PCT No.: PCT/CN2013/087398
§ 371 (c)(1),
(2) Date: Sep. 11, 2015

(87) PCT Pub. No.: WO2014/139293
PCT Pub. Date: Sep. 18, 2014

(65) Prior Publication Data
US 2016/0020662 A1  Jan. 21, 2016

(30) Foreign Application Priority Data
Mar. 11, 2013 (CN) .......................... 2013 1 0076619

(51) Int. Cl.
*H02K 5/124* (2006.01)
*H01F 38/18* (2006.01)
(Continued)

(52) U.S. Cl.
CPC ............. *H02K 5/124* (2013.01); *H01F 38/18* (2013.01); *H02K 5/128* (2013.01)

(58) Field of Classification Search
CPC .......... H02K 5/124; H02K 5/12; H02K 5/128; H02K 2005/1287; H02K 7/08;
(Continued)

(56) References Cited

U.S. PATENT DOCUMENTS 5,418,446 A * 5/1995 Hallidy .................. H02K 19/28
322/28
5,720,590 A * 2/1998 Hofmeister .............. B25J 9/107
414/744.2
(Continued)

FOREIGN PATENT DOCUMENTS

CN  102152318 A * 8/2011
CN  103192384 A * 7/2013 ............. H02K 5/124
(Continued)

*Primary Examiner* — Edgardo San Martin

(57) ABSTRACT

A static vacuum shafting device for an integrated rotary transformer includes: a driving component, a vacuum sealing cover, a position detection component, a shafting base, a vacuum insulation sleeve, three O-shaped seal rings, a first rolling bearing, a second rolling bearing, a bearing gap ring, a transmission shaft, a shafting flange, a walking rolling bearing, and two bearing glands. The driving component includes a motor stator, a rotary transformer stator, a motor and rotary transformer integrated rotor, a rotor flange plate and a stator-fixing pressing block which are coaxially assembled. The vacuum sealing cover includes a sealing cover upper flange, a sealing cover, and a sealing cover lower flange. The shafting device couples a motor shaft to a load rigidly, thereby achieving a "zero-transmission" method and a "zero-leakage" sealed transmission of a shafting, and is particularly suitable for a power transmission of a vacuum robot in a high-vacuum environment.

10 Claims, 1 Drawing Sheet

(51) Int. Cl.
  *B25J 9/12*    (2006.01)
  *H02K 5/128*   (2006.01)
  *H02K 5/12*    (2006.01)
  *B25J 9/10*    (2006.01)

(58) Field of Classification Search
  CPC ........ H02K 7/085; H02K 11/00; H01F 38/18; H01F 38/00; B25J 9/10; B25J 9/12; B25J 9/126; B25J 9/0009; B25J 9/0021; F16J 15/00; F16J 15/16; F16J 15/50; F16J 15/52
  See application file for complete search history.

(56) References Cited

U.S. PATENT DOCUMENTS

| | | | | |
|---|---|---|---|---|
| 6,363,808 B1* | 4/2002 | Wakabayashi | .... | H01L 21/67742 310/112 |
| 6,485,250 B2* | 11/2002 | Hofmeister | ..... | B25J 9/042 414/744.1 |
| 6,543,306 B1* | 4/2003 | Wakabayashi | .... | H01L 21/67742 310/112 |
| 7,336,012 B2* | 2/2008 | Tanaka | ..... | B25J 9/042 310/112 |
| 7,578,649 B2* | 8/2009 | Caveney | ..... | B25J 9/042 414/744.1 |
| 7,645,112 B2* | 1/2010 | Minami | ..... | B25J 9/1065 414/744.5 |
| 7,688,017 B2* | 3/2010 | Hudgens | ..... | B25J 9/126 310/112 |
| 7,891,935 B2* | 2/2011 | Kremerman | ..... | B25J 9/042 414/744.5 |
| 7,950,890 B2* | 5/2011 | Nakamura | ..... | B25J 9/126 414/217 |
| 8,716,909 B2* | 5/2014 | Hosek | ..... | H02K 5/128 310/64 |
| 9,202,733 B2* | 12/2015 | Hosek | ..... | H01L 21/677 |
| 9,325,228 B2* | 4/2016 | Hudgens | ..... | H02K 5/128 |
| 9,742,250 B2* | 8/2017 | Kremerman | ..... | H02K 16/00 |
| 2013/0149076 A1* | 6/2013 | Cox | ..... | B65G 49/00 414/217 |
| 2014/0271055 A1* | 9/2014 | Weaver | ..... | H01L 21/67161 414/221 |
| 2015/0270059 A1* | 9/2015 | Duval | ..... | B64C 11/44 416/155 |
| 2015/0303764 A1* | 10/2015 | Hosek | ..... | H02K 5/128 310/68 B |

FOREIGN PATENT DOCUMENTS

CN   1 051 71 701 A   * 12/2015
JP   2000069741 A   * 3/2000

* cited by examiner

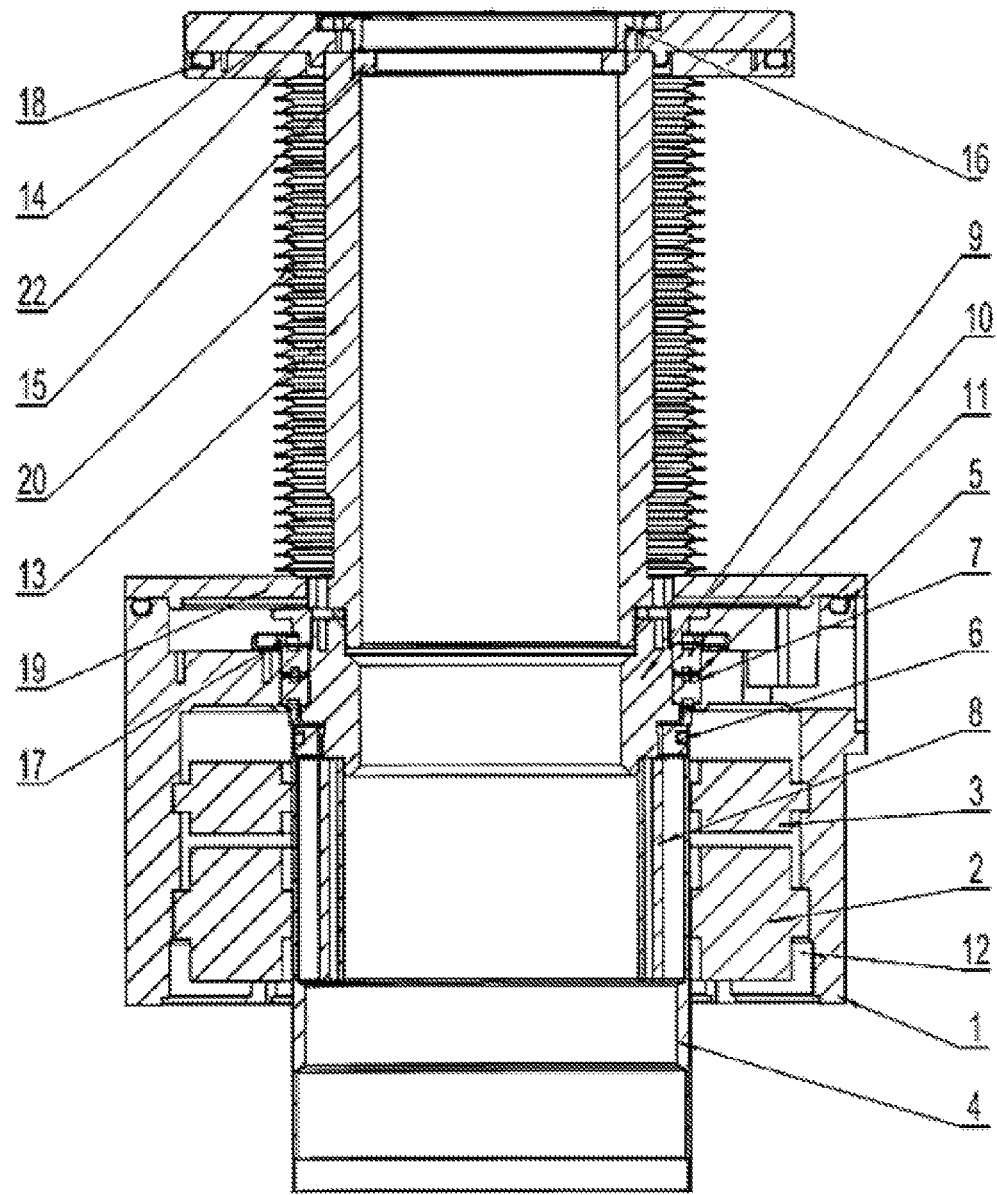

US 9,966,812 B2

STATIC VACUUM SHAFTING DEVICE FOR INTEGRATED ROTARY TRANSFORMER

CROSS REFERENCE OF RELATED APPLICATION

This is a U.S. National Stage under 35 U.S.C. 371 of the International Application PCT/CN2013/087398, filed Nov. 19, 2013, which claims priority under 35 U.S.C. 119(a-d) to CN 201310076619.6, filed Mar. 11, 2013.

BACKGROUND OF THE PRESENT INVENTION

Field of Invention

This invention relates to a device in the field of vacuum robot, and specifically to a static vacuum shafting device for an integrated rotary transformer.

Description of Related Arts

For rapid development of large-scaled integrated circuit industry, its main technique is in transition from Φ 300 mm, 65 nm to Φ 450 mm, 32 nm. The practice has proven that, many front-end technologies for 0.35 μm or below must be conducted under the ultra-high clean vacuum environment, such as ion implantation, corrosion, coating, deposition, and sputtering. To improve the cleanliness and production efficiency, and reduce the cost, cluster tool has become a main development stream for front-end device of semiconductor. The vacuum robot is the core part of wafers in the integrated circuit device to transmit among various reaction chambers. Because the vacuum robot needs to operate under the vacuum environment, sealing isolation and power transmission between atmospheric and vacuum environment are a technical bottleneck restricting the performance improvement of vacuum robot. The motor shafting and displacement measurement device thereof are the core part of vacuum robot, thus dealing with the vacuum isolation between motor and displacement measurement component properly becomes the core technique to design a vacuum robot shafting.

The critical difference between atmospheric and vacuum robot relies in the power transmission. The atmospheric robot can directly install the motor at the joint position to drive arms. However, arms of the vacuum robot must be operated under a high-vacuum high-cleanness environment. If the motor is directly connected to the arms as well, particles and gases released by the plastic insulation materials on the lateral surface of a motor stator under a vacuum environment will damage the high-vacuum high-cleanness environment. In addition, the copper loss (heat work) to drive the motor directly is relatively large, and is hard to achieve heat dissipation under a vacuum environment, so the motor stator must be installed in the atmospheric environment. On these grounds, how to transmit the motor power from atmospheric environment to the robotic arms under a vacuum environment becomes a bottleneck for the research and development of vacuum robot.

The common vacuum mechanical arm shafting usually realizes static sealing though magnetic couplings, but it also has the following disadvantages. Firstly, in a vacuum environment, the shafting needs special lubrication to reduce the pollution released to the vacuum environment by particles. Secondly, permanent magnet and glue will bring some gas leaks under a vacuum environment. Thirdly, there are gaps between the motor stator and rotor, as well as active magnetic coupling rotor and follow-up rotor, bringing complexity to system control and reducing the system rigidity.

The position detection component is usually required in the shafting system, by which the position and speed of the motor rotor can be measured in real time, and thus to achieve the high accuracy control over the speed, torque, position and good performance.

As an electromagnetic transducer, the rotary transformer is a small alternating-current motor for testing angles in essence, which is used to test shaft angle displacement and angular speed of rotary objects. The structure is very simple, which only has stator, and rotor and no electronic components inside. With the increasing demand on electronical automation control, motor with rotary transformer for rotary shafting becomes a common component.

However, the motor used for vacuum robot shafting is relatively large on weight and space, and the interference by motor bearing and rotor of rotary transformer will result in difficult arrangement in space. At the same time, due to the space limit, the distance between the rotary transformer and other parts is relatively narrow, bringing larger difficulties in design, manufacture, and repair. Besides, because the vacuum isolation between the motor and a displacement measurement device cannot be solved, the rotary transformer is seldom employed as the displacement measurement device for shafting in the vacuum shafting.

SUMMARY OF THE PRESENT INVENTION

This invention provides a static vacuum shafting device for an integrated rotary transformer with main purpose of overcoming the deficiencies in the prior art. Firstly, the present invention tightens the structure, reduces the volume, leads to a flexible and convenient installation, and shortens the development cycle. Secondly, the present invention couples a motor shafting to a load rigidly, achieves the "zero-transmission" method, stables the operation, and lowers the noise. Thirdly, the present invention realizes the seamless integration of the position detection component and the motor and achieves the "zero-leakage" sealed transmission of the shafting. The present invention is applicable in the vacuum, liquid, hazardous gases, hazardous liquids, and ultra clean environment of chemical refining and pharmaceutical equipments, and especially suitable for a power transmission of vacuum robots in high vacuum environment.

According to one aspect of this invention, this invention provides a static vacuum shafting device for an integrated rotary transformer, comprising: a driving component, a vacuum sealing cover, a position detection component, a shafting base, a vacuum insulation sleeve, a second O-shaped seal ring, a first O-shaped seal ring, a first rolling bearing, a second rolling bearing, a bearing gap ring, a transmission shaft, a shafting flange, a walking rolling bearing, a first bearing gland, a second bearing gland and a third O-shaped seal ring.

The driving component comprises a motor stator, a rotary transformer stator, a motor and rotary transformer integrated rotor, a rotor flange plate and a stator-fixing pressing block which are coaxially assembled, wherein: the motor and rotary transformer integrated rotor and the rotor flange plate are connected with screws; the motor stator and the rotary transformer stator are fixed inside of the shafting base by the stator-fixing pressing block, and work in close conjunction with the shafting base.

The vacuum sealing cover comprises a sealing cover upper flange, a sealing cover, and a sealing cover lower flange, wherein: the sealing cover lower flange is fixed on an upper end surface of the shafting base with screws; the shafting base has a second circular groove and the second O-shaped seal ring is filled in the second circular groove; the sealing cover upper flange is fixed to the shafting flange of the transmission shaft with screws; the sealing cover upper flange has a third circular groove and the third O-shaped seal ring is filled in the third circular groove; the vacuum sealing cover is able to shrink up and down freely in cooperation with a driving mechanism which controls up and down movement, so as to drive the whole shafting base to move up and down.

A lower end surface of the transmission shaft is fixed to the rotor flange plate with screws, and an upper end surface of the transmission shaft is extended to a vacuum environment. The upper end surface of the transmission shaft has a groove for the walking rolling bearing, and the walking rolling bearing is fixed to the upper end surface of the transmission shaft by the second bearing gland; the upper end surface of the transmission shaft is fixed with the shafting flange; the first rolling bearing and the second rolling bearing are equipped between the rotor flange plate and the shafting base; the bearing gap ring is added between the first rolling bearing and the second rolling bearing; the second bearing gland tightly presses the second rolling bearing on the shafting base; an inner of the vacuum insulation sleeve is a stepped hollow cover, and one end of the vacuum insulation sleeve is provided with a threaded hole fixed to the shafting base; the shafting base has a first circular groove and the first O-shaped seal ring is filled in the first circular groove; the motor stator and the rotary transformer stator form gap with the motor and rotary transformer integrated rotor; the vacuum insulation sleeve runs through the gap to isolate the motor and rotary transformer integrated rotor from the motor stator and the rotary transformer stator.

Preferably, middle parts of both sides of the motor stator and the rotary transformer stator are boss structure.

Preferably, the gap between the motor stator and the motor and rotary transformer integrated rotor and the gap between the rotary transformer stator and the motor and rotary transformer integrated rotor are both 1.5 mm~2.5 mm.

Preferably, the gap between the motor stator and the motor and rotary transformer integrated rotor and the gap between the rotary transformer stator and the motor and rotary transformer integrated rotor are both 2 mm.

Preferably, the motor and rotary transformer integrated rotor adopts a design of hollow structure which is used to make wiring run through a middle of a shafting.

Preferably, a magnet periphery of the motor and rotary transformer integrated rotor is covered with non-magnetic protective tube.

Preferably, the motor and rotary transformer integrated rotor can use gum and positioning flange at the same time to fix the magnet.

Preferably, all magnetic surfaces of the motor and rotary transformer integrated rotor, the motor stator, and the rotary transformer stator can be covered with nickelage or galvanization.

Preferably, the vacuum insulation sleeve adopts non-magnetic materials.

Preferably, original and copy windings of the rotary transformer are both distributed at a stator side of the rotary transformer.

More specifically, this invention is achieved by technical plans as below, comprising the driving component, the position detection component, the shafting base, the vacuum insulation sleeve, the vacuum sealing cover, the flange plate, and the transmission shaft. The driving component and the position detection component achieve an integrated assembly via a shafting static vacuum insulation method, which are installed inner of the shafting base. The vacuum insulation sleeve runs through the gap between the driving component and the position detection component, so as to achieve the transmission from the atmospheric environment to the vacuum environment, and isolate the atmospheric environment from the vacuum environment at the same time. A lower end surface of the flange plate is respectively connected to the vacuum insulation sleeve and the shafting base with screws, and an upper end surface of the flange plate is connected to a lower end of the transmission shaft, so as to achieve a power transmission for a circumvolution of the shafting transmission shaft led by the driving component. A lower end of the vacuum sealing cover is connected to the shafting base by the flange plate, and an upper end of the vacuum sealing cover is connected to an upper end of the transmission shaft by the flange plate. In this way, the shafting vacuum insulation of multi-shaft zero-leakage can be achieved, so as to ensure that the whole shafting of the vacuum robot can be operated under the vacuum environment in a form of static transmission. All these components are coaxially assembled.

As a permanent magnet synchronous motor with magnetic direct driving technique, the driving component comprises outside magnetic stator and inside magnetic rotor, in which the stator and the rotor exist without any contact. The outside magnetic stator is made up of rotary electromagnetic field coil. As a driving component of the shafting, the coil, once electrified, is able to generate a rotary electromagnetic field which drives the inside magnetic rotor to rotate, wherein the inside magnetic rotor is sealed in a vacuum container by an insulation sealing sleeve. The inside magnetic rotor and arms of the vacuum robot are directly connected, which can achieve driving loads to move without any retarding mechanisms, such as gear and belt pulley. There remains certain gap between the outside magnetic stator and the inside magnetic rotor for installation of the vacuum insulation sleeve to achieve the vacuum isolation. The stator and rotor of the motor are operated under atmospheric and vacuum environment respectively, thereby obtaining high vacuum degree with relatively simple design, and ensuring that all the motor terminals are installed under the atmospheric environment.

As a sine cosine magneto-resistive rotary transformer, the position detection component is able to detect the position and speed of the motor rotor in real time. Similar to the structure and operating principle of permanent magnet synchronous motor, the rotary transformer comprises an outside magnetic stator and an inside magnetic rotor, in which the stator and the rotor exist without any contact.

The operating principles of the inside magnetic rotor of the motor and the inside magnetic rotor of the rotary transformer are shown as below. The operating principle of the sine cosine magneto-resistive rotary transformer is similar to the operating principle of the permanent magnet synchronous motor. Both of their windings are located on the outside magnetic stator, and the inside magnetic rotor is just an iron core made of permanent magnet materials, with no winding embedded. A shape of each pair of reluctance and pole on the rotor makes the air-gap permeance is only provided with a constant component and a fundamental component as a position of the rotor changes. As a result, a position signal that changes with the sine can be obtained in signal winding. It is concluded that the inside magnetic rotor of the motor is extended to act as the inside magnetic rotor of the rotary transformer, while the inside magnetic rotor of the rotary transformer is removed, which achieves the integrated installation technology of the driving component and the position detection component. The advantages of such design are shown as below.

1. It can achieve the vacuum and atmospheric isolation between the stator and rotor, and contribute to a connection between the vacuum and atmosphere without electric signal.

2. It can effectively reduce excessive waste of permanent magnet materials, and avoid potential pollution to vacuum environment caused by tiny ferromagnetic particles that easily adsorbed by excessive permanent magnets in the movement period.

3. It can effectively improve the detection precision of the rotary transformer, and better ensure the performance of the rotary transformer.

The integrated inside rotor adopts the design of hollow structure, allowing wiring to run through the middle of shafting.

One end of the integrated inside rotor is punched with a hole, or threaded hole to make the connection of the transmission shaft easier.

The magnet periphery of the integrated inside rotor is covered with non-magnetic protective tube to prevent the permanent magnets from polluting the vacuum environment.

The inside rotor uses gum and positioning flange at the same time to fix the magnet, to improve the connection reliability of the shafting. A dovetail groove type or a T-shaped groove type can be selected as the positioning flange.

Preferably, to protect the magnet, all the magnetic surfaces of the stators and rotors can be covered with nickelage or galvanization.

The stator-fixing pressing block is punched with the threaded hole to fix the motor stator and the rotary transformer stator on the shafting base.

The stator-fixing pressing block is made up of a shell main body and a shell bottom part, which can be divided into several components, processed respectively, and assembled together.

The gap between the stator and rotor is relatively larger than the gap in common motors, reaching up to 1.5 mm~2.5 mm. The change in the gap between the stator and rotor may bring about an effect on the motor performance. As a result, after comparing the gap flux density among various motors, it is found out that the increasing gap may result in decreasing value of the gap flux density, but the flux density sinuousness should be correct. The harmonic analysis of flux density in various gaps is conducted, and performance of different gap motor of stator and rotor shall be comprehensively considered. The gap between the stator and rotor of 2 mm is selected for an optimum performance.

The vacuum insulation sleeve is a hollow cover, whose size shall be determined by the corresponding outside magnetic stator of the rotary transformer and the outside magnetic stator of the permanent magnet synchronous motor.

The vacuum insulation sleeve is thin-shelled container widget. The intensity of such vacuum insulation sleeve must be checked whether it can afford the different pressures of the media on both sides in the design of magnetic transmission, and the compressed deformation must be detected to know whether it satisfies the application requirements or not.

The non-magnetic materials can be selected for the vacuum insulation sleeve to avoid the distribution changes in flux density, such as glass, copper alloy, aluminium alloy, or stainless steel. Due to the restriction for gap width between inside and outside stators and rotors, the side thickness should not be too large, and 0.75 mm is selected in this invention.

The O-shaped seal ring is adopted between the vacuum insulation sleeve and the inside magnetic rotor for further seal.

The sealing cover can shrink up and down freely, cooperate with the driving mechanism which controls up and down movement, and drive the whole shafting base to move up and down, and thus to control the arms of the vacuum robot for up and down movement.

The flange plate is punched with a groove, which is sealed by the O-shaped seal ring.

According to the other aspect of this invention, this invention also provides a static vacuum isolation method of an integrated rotary transformer, comprising the following steps.

Step 1: To design a permanent magnet synchronous motor with magnetic direct driving technique as a driving component of a shafting, comprising an outside magnetic stator and an inside magnetic rotor, in which the stator and the rotor exist without any contact. The outside magnetic stator is made up of rotary electromagnetic field coil. As the driving component of the shafting, the coil, once electrified, generates a rotary electromagnetic field which drives the inside magnetic rotor to rotate, wherein the inside magnetic rotor is sealed in a vacuum container by an insulation sealing sleeve. The inside magnetic rotor and arms of a vacuum robot are directly connected, which can achieve driving loads to move without any retarding mechanisms, such as gear and belt pulley. There remains certain gap between the outside magnetic stator and the inside magnetic rotor for the vacuum isolation.

Step 2: To design a sine cosine magneto-resistive rotary transformer as a position detection component of a motor, which detects a position and a speed of a motor rotor in real time. Similar to the structure and operating principle of the permanent magnet synchronous motor, the rotary transformer comprises an outside magnetic stator and an inside magnetic rotor, in which the stator and the rotor exist without any contact.

Step 3: The designed permanent magnet synchronous motor and rotary transformer have similar structure and operating principle, this invention proposes a method of an integrated design of the inside magnetic rotor in the motor and the inside magnetic rotor in the rotary transformer to achieve a transmission from dynamic seal to static seal, which means extending a terminal of the inside magnetic rotor in the motor, removing the inside magnetic rotor in the rotary transformer, and making the motor and the rotary transformer use the same inside magnetic rotor, thereby simplifying the structure of the whole shafting and providing essential conditions for the shaft static vacuum isolation method.

Step 4: The inside magnetic rotor needs to operate in a high-cleanness vacuum environment. The magnetic surface is liable to absorb tiny ferromagnetic particles, which may pollute the clean environment and influence the processing quality of chips. As a result, a sealed vacuum insulation sleeve is designed to seal the inside magnetic rotors of the integrated motor and rotary transformer in the sleeve, restrict movement in a radial direction and an axial direction, and improve the reliability at the same time.

Compared with the prior arts, advantages of the static vacuum shafting device for the integrated rotary transformer and its method in this invention are shown below.

1. The whole shafting bandwidth is lengthened; because the ballscrew, reducer, and other intermediate links are removed, a motor inertia becomes smaller, a bandwidth of a position loop and a speed loop become larger, and a dynamic response performance of the whole shafting is greatly enhanced.

2. The magnetic direct driving technique is adopted and there is no high-speed rotating component, so the vibration and noise caused by the imbalance of high-speed rotating component diminish. In this way, not only the resonant frequency of the whole shafting is reduced, but also the static and dynamic errors of the controlled object are effectively controlled.

3. Removing an intermediate transmission link in a servo system, and directly coupling or connecting a direct drive motor (direct driving rotating motor or direct driving line motor) to a slave load achieve a rigid coupling of motor shaft and load, zero-transmission way, stable operation, and low noise.

4. In the rotation process, the vacuum insulation sleeve isolates the inside magnetic rotor from the outside magnetic stator, and magnetic flux transmits the power and movement of the outside magnetic stator to the inside magnetic rotor by running through the vacuum insulation sleeve. The dynamic seal is changed into a mode of zero friction and a static seal is provided with no lubrication requirement, so as to achieve a contactless "zero-leakage" seal transmission.

5. With simple design and compact structure, after integrating the inside magnetic rotors of the motor and the rotary transformer, the system volume is reduced, and due to the simple system, the development cycle is shortened as well.

6. Adopting the structure of big gap is conductive to achieve the effective isolation of rotor vacuum environment and stator atmospheric environment, which is more suitable to the semiconductor industry.

BRIEF DESCRIPTION OF THE DRAWINGS

These and other objectives, features, and advantages of the present invention will become apparent from the following detailed description, the accompanying drawings, and the appended claims.

The FIGURE is an A-A sectional view of a static vacuum shafting device for an integrated rotary transformer according to a preferred embodiment of this invention.

DETAILED DESCRIPTION OF THE PREFERRED EMBODIMENT

Detailed description with reference to this invention is given by the following specific embodiments. The following embodiments will help those technicians in this art for further understanding of this invention, but this invention is not limited in any form. It should be noted that, without departing from the concept of the utility model, those ordinary technicians in this art may make a plurality of modifications and improvements. These are all within the protection scope of this invention.

Further description with reference to specific structure and assembly of this invention for is given by the FIGURE as below.

As shown in the FIGURE, according to a preferred embodiment of this invention, a static vacuum shafting device for an integrated rotary transformer comprises a driving component, a position detection component, a shafting base 1, a vacuum insulation sleeve 4, a vacuum sealing cover, a flange plate and a transmission shaft 13. All these components are coaxially assembled.

The driving component and the position detection component are integrated together, whose integrated assembly is achieved by using a static vacuum isolation method, and both of them are installed in an inner part of the shafting base. The vacuum insulation sleeve runs from a gap between the driving component and the position detection component, so as to achieve a power transmission from an atmospheric environment to a vacuum environment, and isolate the atmospheric environment from the vacuum environment at the same time. A lower end surface of the flange plate is respectively connected to the vacuum insulation sleeve and the shafting base with screws, and an upper end surface of the flange plate is connected to a lower end of the transmission shaft, so as to achieve a power transmission for a circumvolution of the transmission shaft led by the driving component. A lower end of the vacuum sealing cover is connected to the shafting base by the flange plate, and an upper end of the vacuum sealing cover is connected to an upper end of the transmission shaft by the flange plate. In this way, a shafting vacuum isolation of multi-shaft zero-leakage can be achieved, and thus to ensure that the whole shafting of a vacuum robot can be operated under the vacuum environment in a form of static transmission. All these components are coaxially assembled.

The driving component and the position detection component are coaxially installed on the shafting base 1, comprising: a permanent magnet synchronous motor stator 2, a rotary transformer stator 3, a motor and rotary transformer integrated rotor 8, a rotor flange plate 9, and a stator-fixing pressing block 12. According to the preferred embodiment, the motor and rotary transformer integrated rotor 8 and the rotor flange plate 9 are connected with screws; a first rolling bearing 7 and a second rolling bearing 10 are provided between the rotor flange plate 9 and the shafting base 1. A bearing gap ring 11 is set between the two rolling bearings for avoidance of friction, and the second rolling bearing 10 is tightly pressed on the shafting base 1 by a second bearing gland 17. A structure of the motor stator 2 is similar to a structure of the rotary transformer stator 3. Middle parts of both sides of the motor stator 2 and the rotary transformer stator 3 are boss structure to fit closely with the shafting base 1. Three threaded holes are evenly distributed on the two stators, which are fixed in an inner part of the shafting base 1 by the stator-fixing pressing block 12. The motor stator 2 and the rotary transformer stator 3 are arranged coaxially, forming a gap with the integrated rotor 8 for installation of the vacuum insulation sleeve. All these components are coaxially assembled.

The gap between the stator and the rotor is relatively larger than the gap in common motors, reaching up to 1.5 mm~2.5 mm. The change in the gap between the stator and the rotor may bring about an effect on the motor performance. As a result, after comparing a gap flux density among various motors, it is found out that the increasing gap may result in decreasing value of gap flux density, but the flux density sinuousness should be correct. The harmonic analysis of flux density in various gaps is conducted, and performance of different gap motor of stator and rotor shall be comprehensively considered. The gap between the stator and rotor of 2 mm is selected for an optimum performance.

The stator-fixing pressing block 12 is provided with a seam allowance, playing a role of centering and heat dissipation.

The vacuum insulation sleeve 4 is a stepped hollow cover, whose size shall be determined by the motor stator 2 of the corresponding rotary transformer, the rotary transformer stator 3 of the permanent magnet synchronous motor, and the integrated rotor 8. One end of the vacuum insulation sleeve 4 is punched with a threaded hole to be fixed on the shafting base 1. To achieve the zero-leakage, the shafting base 1 has a first circular groove where a first O-shaped seal ring 6 is filled.

A lower end surface of the transmission shaft 13 is fixed to the rotor flange plate 9 with screws, and an upper end surface of the transmission shaft 13 is extended to the vacuum environment, whose length can be designed according to the specific needs. The upper end surface of the transmission shaft 13 is equipped with a groove for containing a walking rolling bearing 15, wherein the walking rolling bearing 15 is fixed to the upper end surface of the transmission shaft 13 by a first bearing gland 16. The upper end surface of the transmission shaft 13 is fixed with the shafting flange 14.

A vacuum sealing cover comprises a sealing cover upper flange 22, a sealing cover 20 and a sealing cover lower flange 19. The sealing cover lower flange 19 is fixed on an upper end surface of the shafting base 1 with screws. In order to achieve a zero-leakage, the shafting base 1 has a second circular groove where a second O-shaped seal ring 5 is filled. The sealing cover upper flange 22 is fixed to the shafting flange 14 of the transmission shaft 13 with screws. In the same way, the sealing cover upper flange 22 has a third circular groove where a third O-shaped seal ring 18 is filled. The sealing cover 20 is able to shrink up and down freely, cooperate with a driving mechanism which controls up and down movement, and drive the whole shafting base for up and down movement. The vacuum sealing cover further isolates the atmospheric environment from the vacuum environment.

When using the above device, the rotary electromagnetic field coil of the outside magnetic stator of the permanent magnet synchronous motor is electrified to generate the rotary electromagnetic field. Using the magnet coupling of permanent magnet, the rotary electromagnetic field drives the integrated rotor which is sealed in the vacuum container to rotate through the vacuum insulation sleeve.

On one hand, the permanent magnet inside the rotor effectively forms the flux density distributed in a sine cosine function, and a sine cosine output form becomes an output signal form of a standard rotary transformer. In this way, a position signal that changes with the sine can be obtained in signal winding, and then movement position and speed of the motor rotor in real time are obtianed. On the other hand, the integrated rotor is fixed to the transmission shaft by a series of fastening and seal components, and the inner spaces are all vacuum environment. Thus, the power can be directly transmitted to the external environment by the transmission shaft which is connected with robotic arms (not shown in the FIGURE) of the vacuum robot to move in a vacuum chamber (not shown in the FIGURE).

The vacuum insulation sleeve 4 can be either integrated, or manufactured by subsections and assembled together.

The driving component and the position detection component can select different dimensions to make the optimal multi-shaft design as well as the coaxial installation and distribution. In this way, the cost is reduced, the application flexibility is greatly enhanced, and the coupling effect of driving component and displacement detection component is lessened.

The preferred embodiment only takes a static vacuum single shafting device of an integrated rotary transformer as an example, which can cooperate with driving mechanism that controls up and down movement to control the arms of vacuum robot for up and down movement. The ordinal structure is conductive to be extended to a static vacuum shafting device with two or more shafts.

Description for specific embodiments with reference to this invention is given above. It should be known that, this invention is not limited to the above specific embodiments, those technicians in the art can make various modifications and improvements within the scope of claims and without any influence on essential contents of this invention.

What is claimed is:

1. A static vacuum shafting device for an integrated rotary transformer, comprising: a driving component, a vacuum sealing cover, a position detection component, a shafting base (1), a vacuum insulation sleeve (4), a second O-shaped seal ring (5), a first O-shaped seal ring (6), a first rolling bearing (7), a second rolling bearing (10), a bearing gap ring (11), a transmission shaft (13), a shafting flange (14), a walking rolling bearing (15), a first bearing gland (16), a second bearing gland (17), and a third O-shaped seal ring (18); wherein:

said driving component comprises a motor stator (2), a rotary transformer stator (3), a motor and rotary transformer integrated rotor (8), a rotor flange plate (9), and a stator-fixing pressing block (12) which are coaxially assembled, wherein: said motor and rotary transformer integrated rotor (8) and said rotor flange plate (9) are connected with screws; and said motor stator (2) and said rotary transformer stator (3) are fixed inside of said shafting base (1) by said stator-fixing pressing block (12), and work in close conjunction with said shafting base (1);

said vacuum sealing cover comprises a sealing cover upper flange (22), a sealing cover (20), and a sealing cover lower flange (19), wherein: said sealing cover lower flange (19) is fixed on an upper end surface of said shafting base (1) with screws; said shafting base (1) has a second circular groove and said second O-shaped seal ring (5) is filled in said second circular groove; said sealing cover upper flange (22) is fixed to said shafting flange (14) of said transmission shaft (13) with screws; said sealing cover upper flange (22) has a third circular groove and said third O-shaped seal ring (18) is filled in said third circular groove; said sealing cover (20) is able to shrink up and down freely, cooperate with a driving mechanism which controls up and down movement, and drive said shafting base to move up and down; and a lower end surface of said transmission shaft (13) is fixed to said rotor flange plate (9) with screws, and an upper end surface of said transmission shaft (13) is extended to a vacuum environment; said upper end surface of said transmission shaft (13) has a groove for said walking rolling bearing (15), and said walking rolling bearing (15) is fixed to said upper end surface of said transmission shaft (13) by said first bearing gland (16); said upper end surface of said transmission shaft (13) is fixed to said shafting flange (14); said first rolling bearing (7) and said second rolling bearing (10) are provided between said rotor flange plate (9) and said shafting base (1); said bearing gap ring (11) is provided between said first rolling bearing (7) and said second rolling bearing (10); said second bearing gland (17) tightly presses said second rolling bearing (10) on said shafting base (1); an inner of said vacuum insulation sleeve (4) is a stepped hollow cover, and one end of said vacuum insulation sleeve (4) has a threaded hole and is fixed to said shafting base (1); said shafting base (1) has a first circular groove and said first O-shaped seal ring (6) is filled in said first circular groove; said motor stator (2) and said rotary transformer stator (3) both form gap with said motor and rotary transformer integrated rotor (8); said vacuum insulation sleeve (4) runs through said gap to isolate said motor and rotary transformer integrated rotor (8) from said motor stator (2) and said rotary transformer stator (3).

2. The static vacuum shafting device for the integrated rotary transformer, as recited in claim 1, wherein middle parts of both sides of said motor stator (2) and said rotary transformer stator (3) are boss structure.

3. The static vacuum shafting device for the integrated rotary transformer, as recited in claim 1, wherein: said gap between said motor stator (2) and said motor and rotary transformer integrated rotor (8) and said gap between said rotary transformer stator (3) and said motor and rotary transformer integrated rotor (8) are both 1.5 mm~2.5 mm.

4. The static vacuum shafting device for the integrated rotary transformer, as recited in claim 3, wherein: said gap between said motor stator (2) and said motor and rotary transformer integrated rotor (8) and said gap between said rotary transformer stator (3) and said motor and rotary transformer integrated rotor (8) are both 2 mm.

5. The static vacuum shafting device for the integrated rotary transformer, as recited in claim 1, wherein: said motor and rotary transformer integrated rotor is hollow, for allowing wiring to run through a middle of a shafting.

6. The static vacuum shafting device for the integrated rotary transformer, as recited in claim 1, wherein a magnet periphery of said motor and rotary transformer integrated rotor is covered with non-magnetic protective tube.

7. The static vacuum shafting device for the integrated rotary transformer, as recited in claim 1, wherein said motor and rotary transformer integrated rotor has magnets fixed through gum and a positioning flange.

8. The static vacuum shafting device for the integrated rotary transformer, as recited in claim 1, wherein all magnetic surfaces of said motor and rotary transformer integrated rotor, said motor stator, and said rotary transformer stator are covered with nickelage or galvanization.

9. The static vacuum shafting device for the integrated rotary transformer, as recited in claim 1, wherein said vacuum insulation sleeve is made of non-magnetic materials.

10. The static vacuum shafting device for the integrated rotary transformer, as recited in claim 1, wherein original and copy windings of said rotary transformer are both distributed at a stator side of said rotary transformer.

* * * * *